United States Patent
Krall et al.

[11] 3,791,258
[45] Feb. 12, 1974

[54] STRAND MILLING MACHINE
[75] Inventors: Heribert A. Krall, Wurzburg; Helmut Maag, Hochberg, both of Germany
[73] Assignee: Technica - Guss GmbH, Wurzburg, Germany
[22] Filed: Jan. 16, 1973
[21] Appl. No.: 324,042

[30] Foreign Application Priority Data
Mar. 15, 1972 Germany............................ 2212344

[52] U.S. Cl................... 90/21 C, 29/33 C, 164/76, 164/154
[51] Int. Cl............................................... B23c 3/14
[58] Field of Search ............. 164/76, 154, 263, 270; 29/33 C; 90/21 A, 21 C

[56] References Cited
UNITED STATES PATENTS
3,683,471   8/1972   Lemelson............................ 29/33 C

*Primary Examiner*—Francis S. Husar
*Attorney, Agent, or Firm*—Jones and Lockwood

[57] ABSTRACT

A milling machine receives a strand or billet from a continuous casting machine. The machine has a frame and rollers that mount it for back and forth movement on rails in the line of the feed of the strand from the casting machine. A pair of pressure rollers, one above the other, feed the strand therebetween, one of the rollers being rotated by a motor. The milling machine has support tables adjustable vertically, over which the strand moves, rotating milling cutters above and below the strand for milling the same and pressure tables opposite the cutters so that the top and bottom of the strand are both milled. The two sets of electrical circuit limit switches along the rails. On the bottom portion frame of the movable milling machine is adjustable mounted a rail which contacts an actuating arm of the switches as it moves there over. These limit switches are in a control circuit to an electric motor that drives one of the feed rollers. The feed rolls draw the strand through the milling machine. If the circumferential speed of the feed rolls is faster than the medium strand speed from the drawing mechanism of the casting machine, the milling machine is moved towards the continuous casting plant. If it is lower, it moves away from it. The speed is graduated from switch to switch of each set.

4 Claims, 1 Drawing Figure

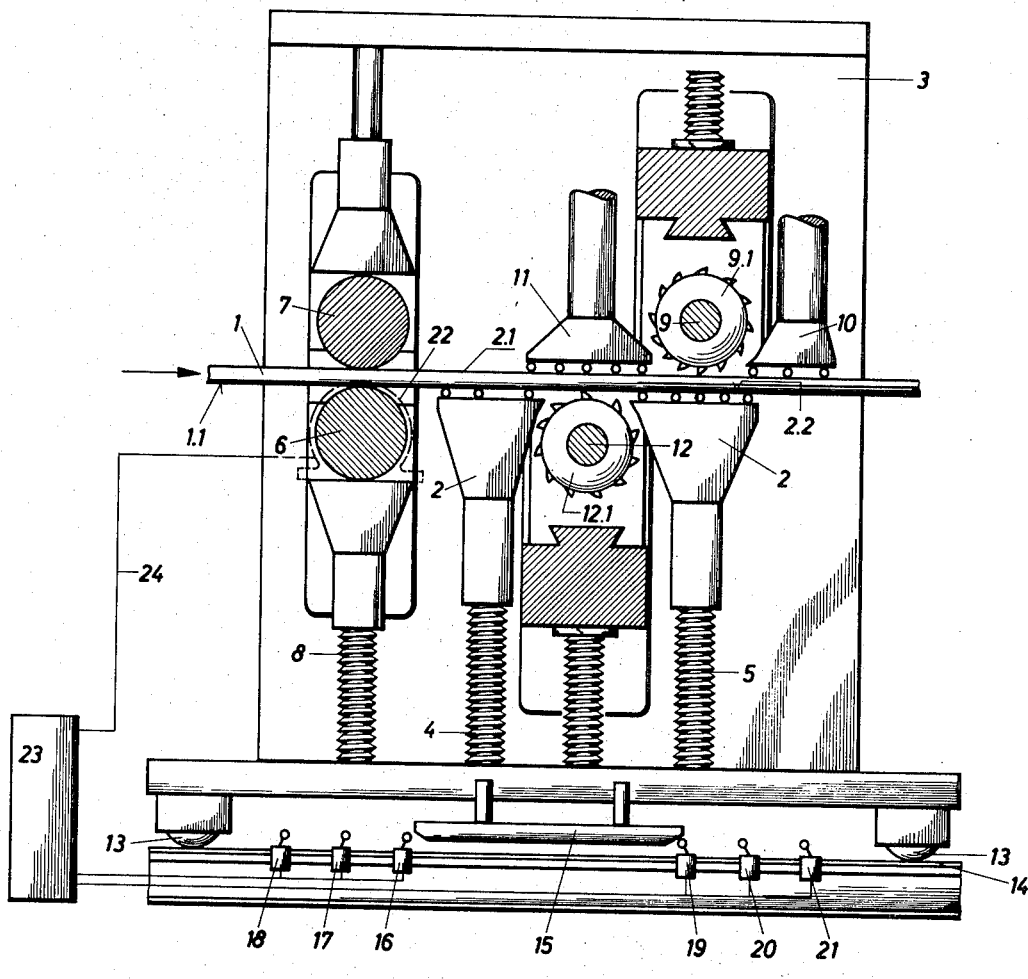

STRAND MILLING MACHINE

BACKGROUND OF THE INVENTION

The invention relates to a milling machine for simultaneous milling of the upper and lower part of a billet or of a strand.

Milling machines of this type are already known. In the Austrian patent specification 213,207 a machine for grooving is described, where the workpiece is taken by advance rolls and led to the cutters. In that specification the upper and the lower cutter are arranged one after the other in feed direction. There are also milling machines, where the cutters are adjusted in a plane which is situated vertically to the feed direction. An example for this is the German specification 1,627,072.

It is an object of the invention to create a milling machine, which in connection with a continuous casting machine, mills the strands which are withdrawn from the casting machine during casting on the upper and lower part, whereby milled surfaces free of grooves and chatter marks and strands of equal thickness are attained.

One starts from the fact that, among other things, in the milling process an equal or uniform feed is assumed in order to attain smooth surfaces. Unequal or non-uniform feeds will lead to different qualities of the surface and of the thickness of the material. Stoppages cause grooves, which are situated below the milled surface, due to the fact that the milling rollers relax.

SUMMARY OF THE INVENTION

The problem is solved by supporting the milling machine for displacement in the drawing direction of the strand relative to the continuous casting plant and by making the feeding speed of the milling machine dependent on the drawing speed of the continuous casting plant.

By preference it is proposed to control the feeding speed in dependence on the displacement of the milling machine relative to the continuous casting plant by means of a limit switch or by a potentiometer, or to drive the feed rolls with a corresponding advance speed, calculated from the mean value of waiting time, the length of the drawing way and the drawing time of the continuous casting plant.

With the milling machine according to the invention it is possible to obtain a smooth surface of the strand, free of grooves and chatter marks and strands of uniform thickness.

DESCRIPTION

An embodiment of the invention is shown in the drawing and will be explained in the following. The drawing shows a front view of the milling machine.

A strand 1 comes from the drawing mechanism of the continuous casting plant which is not shown. On the frame of the milling machine the tables 2 are adjustable in height by spindles 4, 5 so that the lower part 1.1 of the arriving strand 1 can be adjusted concisely with the upper part 2.1 and with respect to the upper part 2.2 of the supporting tables 2. At the lead in end of a first machine table 2 cooperating feeding rolls 6, 7 are disposed one above the other. The lower feeding roll 6 is situated in the frame of the machine 3, adjustable in height by a spindle 8 and is driven by a motor 22 the revolutions of which are adjustable. The upper feeding roll 7 is adjustable in a direction which is vertical to the strand 1 and is adjustable to the strand thickness. Above a second machine table 2 a driven milling cutter roll 9 is situated, which is adjustable in height and on which a cutter 9.1 can be fixed. The continuous strand 1 is held down hydraulically by pressure tables 10 and 11.

In front of the cutter 9.1 above the strand 1 the pressure table 11 is disposed, against which a cutter roll 12 with a cutter 12.1 works. The cutter roll 12 is adjustable in height. Both cutter rolls 9 and 12 are driven by motors through a belt drive. Pressure table 10 is adjacent cutter 9.1 in the direction of the draw.

The frame of the milling machine 3 has support rollers 13 which roll on rails 14 so that the machine is displaced in the feed direction of the strand. On the bottom portion the frame of the machine 3 an actuating rail 15 is adjustably mounted and it actuates limit switches 16 to 21 according to the position of the frame of the milling machine 3.

The feed rolls 6, 7 draw the strand 1 through the milling machine. If the circumferential speed of the feed rolls 6, 7 is faster than the strand speed, the milling machine is moved towards the continuous casting plant. If it is slower, it moves away from it. Consequently the switches 16, 17 or even 18 are pressed through the actuating rail, as well as the switches 19, 20 and 21. The switches 16 to 21 are situated in a circuit of the electric motor 22, which drives the feed roll 6. The switches 16, 17 and 18 are individually connected to a control panel generally indicated at 23 and so are the switches 19, 20 and 21. A power supply cable 24 leads from the control panel 23 to the motor 22.

The circuit is switched so that the motor drives slower on the actuation of the switches 16, 17 or 18 and so that it drives faster on actuation of the switches 19, 20, 21. The speed is graduated from switch to switch.

In spite of the frequent stoppages of the strand, conditioned by the casting process, the advance of the milling machine is not interrupted, so that the strand is worked equally and therefore shows a surface free of grooves and chatter marks and an equal thickness.

What is claimed is:

1. A milling machine having means for simultaneously milling the upper and lower part of a billet or strand as it is fed from a continuous casting plant, means mounting the machine for movement in a path toward and away from the casting plant in the direction of strand feed, a pair of feed rollers on the machine for feeding the strand therebetween with one of said rollers having variable speed drive means, control means along the path of movement of said machine connected to and controlling said feed motor variable speed drive means, said control means being actuated by a rail on said machine actuating said control means as it moves there past, whereby the feed rollers draw the strand through the machine and if the circumferential speed of the feed rollers is faster than the medium strand speed feed from the continuous casting plant, the milling machine is moved towards the casting plant through actuation of the on the strand by decreasing their speed and if it is slower, the machine is moved away from the casting plant by increasing the speed of the feed rollers.

2. A milling machine according to claim 1 wherein said control means along the path of movement of the machine includes limit switches having operating levers moved by said rail on the machine.

3. A milling machine according to claim 1 wherein said control means along the path of movement of the machine include potentiometers having operating means actuated by said rail on the machine.

4. A milling machine according to claim 1 wherein the variable speed drive means for the driven feed roller includes control means dependent on waiting time, the length of the drawing way and the drawing time of the continuous casting plant.

* * * * *